OR 4,054,361

United States Patent [19]
Noguchi

[11] 4,054,361
[45] Oct. 18, 1977

[54] BEAM SCANNING DEVICE WITH LINE IMAGE FORMED BY AND REFLECTED TO OPTICAL ELEMENT

[75] Inventor: Masaru Noguchi, Asaka, Japan

[73] Assignee: Fuji Photo Film Co., Ltd., Minami-ashigara, Japan

[21] Appl. No.: 732,393

[22] Filed: Oct. 14, 1976

[30] Foreign Application Priority Data

Oct. 15, 1975   Japan .................. 50-124040

[51] Int. Cl.$^2$ .................................... G02B 27/17
[52] U.S. Cl. ............................. 350/7; 358/206
[58] Field of Search ........... 350/7, 6, 285; 358/206

[56] References Cited

U.S. PATENT DOCUMENTS

| | | | |
|---|---|---|---|
| 3,087,987 | 4/1963 | Stone | 350/7 |
| 3,750,189 | 7/1973 | Fleischer | 350/7 |
| 3,771,850 | 11/1973 | Casler | 350/6 |
| 3,865,465 | 2/1975 | Tatuoka et al. | 350/7 |
| 3,873,180 | 3/1975 | Bousky | 350/7 |
| 3,897,132 | 7/1975 | Meeussen et al. | 350/7 |
| 3,972,582 | 8/1976 | Oosaka et al. | 350/7 |
| 3,972,583 | 8/1976 | Lobb | 350/7 |

*Primary Examiner*—Jon W. Henry
*Attorney, Agent, or Firm*—Gerald J. Ferguson, Jr.; Joseph J. Baker

[57] ABSTRACT

A beam scanning device comprises a rotating multi-face mirror, a single optical element having major and minor axes of different focal length and an image forming optical system. A beam of collimated light is passed through or reflected by the single optical element a first time to form a line image on the rotating multi-face mirror. The reflected beam of light issuing from the line image is passed through or reflected by the single optical element a second time and the resulting collimated beam is passed through the image forming optical system to form a light spot on the image plane. As the rotating multi-face mirror is rotated, the light spot successively scans the image plane without any displacement of the scanning lines resulting from error in parallelism of the rotating multi-face mirror.

9 Claims, 9 Drawing Figures

BEAM SCANNING DEVICE WITH LINE IMAGE FORMED BY AND REFLECTED TO OPTICAL ELEMENT

BACKGROUND OF THE INVENTION

1. Field of the Invention

This invention relates to a light beam scanning device using a rotating mirror, and more particularly to a light beam scanning device for use in a high speed information recording system connected with, for instance, an electronic computer.

2. Description of the Prior Art

In recent years, a number of devices have been developed for recording and reading out information by causing a beam of light such as a laser beam to scan an information recording medium. Some of these devices employ a rotating multi-face mirror as the beam deflecting means. No matter how precisely a rotating mirror is manufactured, there will inevitably be some degree of error in parallelism between the axis of rotation of the mirror and its reflecting surfaces. This error in parallelism causes the beam reflected by the mirror to be displaced in a direction perpendicular to that in which the mirror deflects the beam in the scanning operation. As a result, the scanning lines formed by the mirror on the scanning surface are not in perfect registration.

Several methods have been proposed for optically compensating for the displacement of the scanning lines so as to obtain scanning lines which register nearly perfectly on the scanning surface. For example, an invention for attaining such compensation is disclosed in Japanese Patent Application Public Disclosure No. 33642/1972. In this invention, the degree of compensation required to eliminate the deviation of the scanning line is first measured for each reflecting surface and the values obtained are stored in a memory device. During the scanning operation, signals are fed from the memory device to a separately provided beam deflecting means in synchronism with the rotation of the rotating multi-face mirror. The separately provided beam deflecting means is driven by the signals from the memory device so as to compensate for the error in parallelism and eliminate the displacement of the scanning lines. This system is disadvantageous in that it requires the provision of a second beam deflecting means and other complex devices for driving said means in accordance with the signals from the memory device.

On the other hand, Japanese Patent Application Public Disclosure No. 49315/1973 describes a system for eliminating scanning line deviation by an optical system employing two cylindrical lenses. The first of these cylindrical lenses is used to form on the reflecting surface of the rotating mirror a line image which lies parallel to the plane formed by the deflected light beams. The second cylindrical lens serves to put the point of deflection on the rotating mirror and the scanning surface into the relationship of object point and image point and as a result the deviation caused by the error in parallelism is eliminated. This system has several defects. Not only does it require two cylindrical lenses but these lenses must be provided in a specific relationship which is by no means easy to attain. Furthermore, as the beam incident on the rotating mirror lies in the same plane as the deflected beams, a large angle of beam deflection can be obtained only if the angle of incidence of the beam impinging on the rotating mirror is made large. As a result, the beam incident on the reflecting surface is apt to be eclipsed thereby.

SUMMARY OF THE INVENTION

In light of the above observations and description of the conventional beam scanning devices, the primary object of this invention is to provide a beam scanning device which eliminates displacement of the scanning lines in the direction perpendicular to the direction of scanning.

Another object of this invention is to provide a beam scanning device in which the displacement of scanning lines resulting from non-parallelism of a rotating mirror is eliminated by the use of a single optical element having a major axis and a minor axis of different focal length.

Still another object of this invention is to provide such a beam scanning device which readily facilitates the placement of the single optical element for eliminating scanning line displacement caused by error in the parallelism of the rotating mirror.

A further object of this invention is to provide such a beam scanning device which does not require the beam incident on the rotating mirror to be in the same plane with the plane defined by the deflected beams so that the angle of incidence of the beam impinging on the reflecting surface can be made small thus minimizing eclipsing of the incident beam by the reflecting surface, a larger effective angle of deflection can be obtained for an incident beam of a given diameter, and an incident beam of larger diameter can be used for a given effective angle of deflection thus affording better resolution on the scanning surface.

The beam scanning device in accordance with the present invention comprises a rotating multi-face mirror, an optical element having major and minor axes of different focal length and an image forming optical system. Having first been passed through or reflected by said optical element, the beam impinging on the rotating mirror forms a line image on the reflecting surface thereof. This line image lies perpendicular to the axis of rotation of the mirror. The beam reflected from the reflecting surface is once more passed through or reflected by said optical element and is then passed through the image forming optical system which produces a light spot on the scanning surface. Consequently, when the rotating mirror is rotated to cause the light spot to scan the scanning surface, the scanning lines so formed will not be displaced even if the reflecting surfaces of the rotating mirror should not be perfectly parallel with the rotating axis.

By an optical element having major and minor axes of different focal length is meant an optical element such as a cylindrical lens which has two axes lying perpendicular to each other, one axis being associated with a shorter focal length and being referred to as the major axis and the other axis being associated with a longer focal length and being referred to as the minor axis. Other optical elements beside the cylindrical lens which fall within this definition are the anamorphic lens, the parabolic-cylindrical mirror and the cylindrical mirror.

DESCRIPTION OF THE PREFERRED EMBODIMENTS

Figure 1:
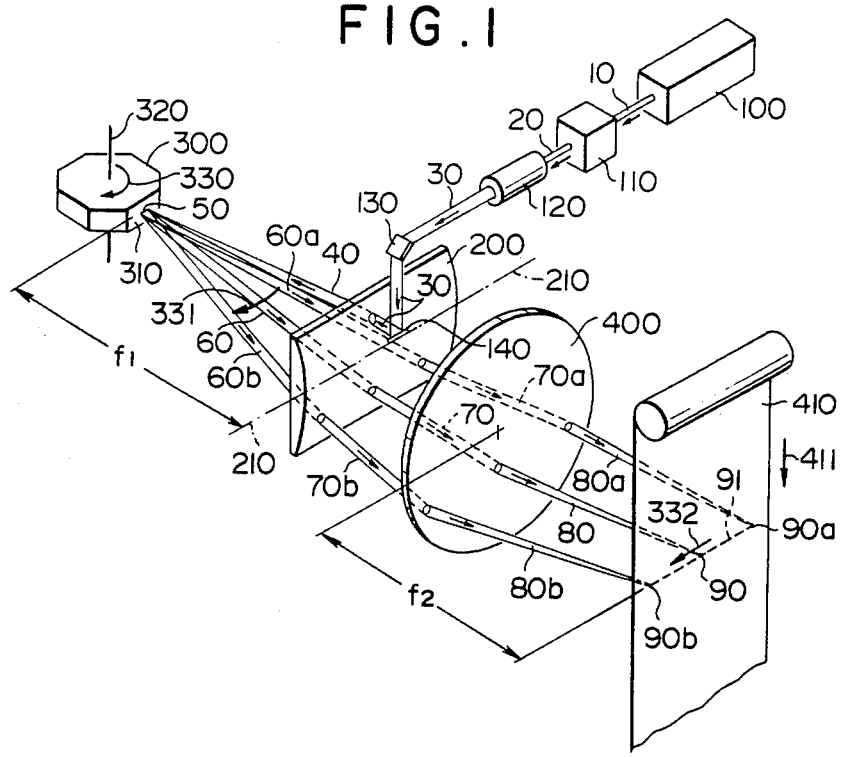
FIG. 1 is a perspective view showing the basic construction of the optical system of one embodiment of this invention applied to a laser recording device.

Preferred embodiments of the invention will now be described with reference to the drawings. As shown in FIG. 1 which shows the basic construction of the optical system of an embodiment of the present invention applied to a laser recording device, a collimated beam of laser light 10 from laser oscillator 100 is passed through light modulator 110 to become modulated light beam 20. If necessary, beam 20 is further passed through beam expander 120 to become light beam 30 of greater beam diameter. Beam 30 is reflected by mirror 130 and mirror 140 and enters cylindrical lens 200. Upon passage through cylindrical lens 200, collimated light beam 30 is converted into beam 40 the rays of which remain parallel in the horizontal direction (the direction parallel to the major axis 210 of cylindrical lens 200) but are vertically converged. Rotating multi-face mirror 300 is fixed at such distance from cylindrical lens 200 that its reflecting surface 310 is separated from cylindrical lens 200 by its focal length f1, that is, by the focal length associated with the major axis of cylindrical lens 200. Thus, as the axis of rotation 320 of rotating multiface mirror 300 is set perpendicular to major axis 210 of cylindrical lens 200, vertically converging beam 40 is focused on reflecting surface 310 as line image 50 extending perpendicularly to the axis of rotation 320 of rotating multi-face mirror 300. Rotation of mirror 300 in the direction of arrow 330 causes the reflected beam to be deflected in the direction of arrow 331.

Consider any reflected beam 60 within the effective angle of deflection and the two beams 60a and 60b at opposite extremities of the effective angle of deflection. Originating from line image 50, reflected beam 60 travels parallelly in the horizontal direction but diverges in the vertical direction until it is changed into perfectly collimated beam 70 (beams 70a and 70b at the extremities of the effective angle of deflection) by its second passage through cylindrical lens 200. Collimated beam 70 is then converted into converging beam 80 (beams 80a and 80b at the extremities of the effective angle of deflection) by image forming (focusing) lens 400 and is focused as light spot 90 (light spots 90a and 90b at the extremities of the effective angle of deflection) on the image plane separated from focusing lens 400 by a distance equal to its focal length. Rotation of mirror 300 in the direction of arrow 330 causes the light spot generated by each successive reflecting surface 310 to run across the image surface from the position of 90a to the position of 90b thus forming successive scanning lines 91. Recording medium 410 is provided with its recording surface at the image surface so that said successive scanning lines record information on recording medium 410 as it is driven in the direction of arrow 411.

Figure 2A:
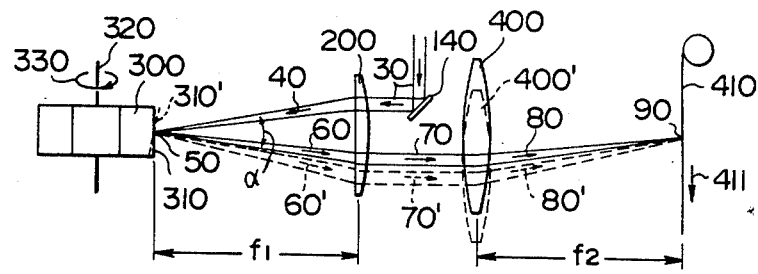
FIGS. 2A and 2B are a side view and a plan view of the laser recording device shown in FIG. 1 respectively showing the manner in which displacement of the scanning line resulting from error in the parallelism of the rotating multiface mirror is eliminated and the manner in which scanning of the light beam is accomplished.

In the above described laser recording device, error in the parallelism of rotating multi-face mirror 300 will not result in any displacement of the scanning line in the direction perpendicular to the direction of scanning as will be clear from the following explanation in respect of FIG. 2A which shows a side view of the optical system depicted in FIG. 1. As shown, collimated light beam 30 passes through cylindrical lens 200 and becomes vertically converging beam 40 which focuses on reflecting surface 310 of rotating multi-face mirror 300. If an error exists in the parallelism of multi-face rotating mirror 300 so as to cause the reflecting surface of the mirror to assume the inclined position 310', the path of the reflected beam will be shifted from that of beam 60 to that of the beam indicated as 60'. Beam 60 or 60' again passes through cylindrical lens 200 to become collimated beam 70 or 70'. As the paths of beams 70 and 70' are parallel, the beam is in either case focused by focusing lens 400 to form a light spot at one and the same position 90 on the image plane separated from lens 400 by the distance of its focal length. As a consequence, an error in the parallelism of rotating multi-face mirror 300 results in no displacement of the scanning line in the direction perpendicular to the scanning direction.

Figure 2B:
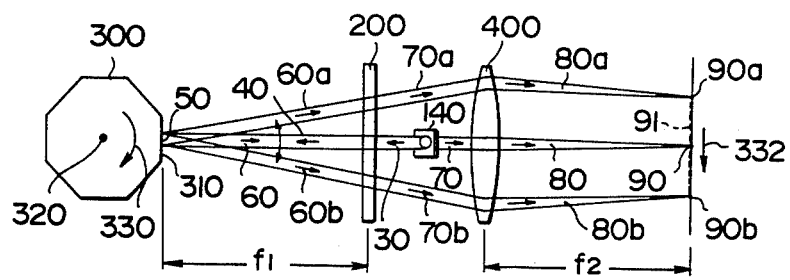

Turning next to FIG. 2B which shows a plan view of the same optical system, it will be noted that collimated beam 30 becomes horizontally collimated beam 40 after its passage through cylindrical lens 200. Beam 60 (beams 60a and 60b at the extremities of the effective angle of deflection) is also horizontally collimated as is the beam 70 (beams 70a and 70b at the extremities of the effective angle of deflection) formed by the second passage of the beam through cylindrical lens 200. As, however, the angle of incidence of beam 70 on focusing lens 400 varies according to its angle of deflection, the position 90 at which the light spot image is formed on the image surface separated from cylindrical lens by a distance equal to its focal length also varies relative to the angle of deflection. Consequently, rotation of mirror 300 in the direction of arrow 330 causes light spot 90 to successively sweep the image plane in the direction of arrow 332 so as to make a single pass between position 90a and position 90b at opposite extremities of the effective angle of deflection once for each reflecting surface.

As seen in FIG. 2A, in accordance with the arrangement of this embodiment, light beam 40 directed toward rotating multi-face mirror 300 is not perpendicular to the mirror's axis of rotation 320 so that an angle α exists between incident beam 40 and reflected beam 60. (The value of angle α varies somewhat with the amount of error in the parallelism of rotating multi-face mirror 300.) If the arrangement is such that angle α is large, deflected beam 70 will pass through the peripheral region of focusing lens 400. As a result, there is a possibility that, in the vicinity of 70a and 70b at the extremities of the effective angle of deflection, beam 70 may be eclipsed by focusing lens 400 or may be influenced by the strong aberration at the peripheral region thereof. In such case, it is preferable to make use of the central region of focusing lens 400 by shifting it to the position indicated by 400'.

Figure 3:
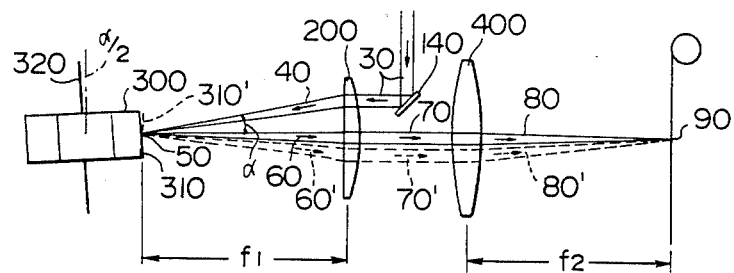
FIG. 3 is a side view showing the manner in which scanning of the light beam is accomplished in a second embodiment of this invention.

FIG. 3 shows another embodiment of this invention wherein the deflected beam is caused to pass within a plane including the common optical axis of cylindrical lens 200 and focusing lens 400. In this embodiment, the axis of rotation 320 of rotating multi-face mirror 300 is tilted from the vertical by an angle of α/2, where α is defined as in the preceding embodiment. Thus, when beam 40 directed to reflecting surface 310 of rotating multi-face mirror 300 is reflected at an angle α (α changing somewhat in value when the reflecting surface takes the non-parallel position 310' thus causing the reflected beam to take path 60'), reflected beam 60 will be caused by the rotation of mirror 300 to swing across the effective angle of deflection in a plane which includes the optical axis of cylindrical lens 200. Collimated beam 70 emerging from the other side of cylindrical lens 200 will further be deflected in a plane which includes the optical axis of focusing lens 400. Upon passage through lens 400, beam 70 becomes converging beam 80 which produces light spot 90 on the image plane separated from lens 400 by a distance equal to its focal length. Even if the reflecting surface should be tilted out of parallel as indicated by 310', the resulting reflected beam 60' will still be focused as a light spot at the same position 90 so that, as in the previously described first embodiment, no displacement of the scanning line in the direction perpendicular to the direction of scan is caused by an error in parallelism of rotating multi-face mirror 300. As in this embodiment the beam deflected by the rotation of mirror 300 is deflected in a plane which includes the common optical axis of cylindrical lens 200 and focusing lens 400, it is almost totally free from the aberration effect of these lenses and is further free from eclipsing by focusing lens 400.

Figure 4:
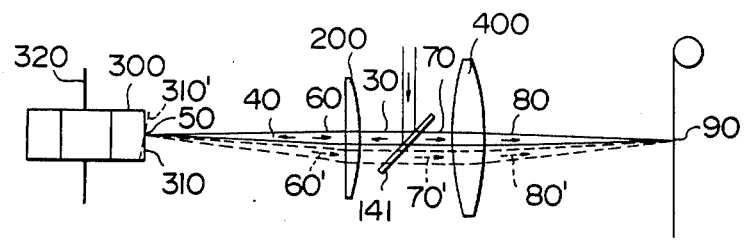
FIG. 4 is a side view showing the manner in which scanning of the light beam is accomplished in a third embodiment of this invention.

FIG. 4 shows a third embodiment of the invention wherein beam 40 impinging on rotating multi-face mirror 300 is directed so as to be perpendicular to axis of rotation 320 thereof. In this embodiment, collimated light beam 30 is reflected by half-mirror 141, passed through cylindrical lens 200 and directed along a path which lies perpendicular to axis of rotation 320. Beam 60 reflected by reflecting surface 310 travels back to half-mirror 141 along the same path as that followed by beam 40, passes through focusing lens 400 as collimated light beam 70 and is focused as light spot 90 on the image plane. Displacement of the scanning beam as a result of error in the parallelism of rotating multi-face mirror 300 is prevented in the same manner as in the first two embodiments described. In this embodiment, the usable quantity of light is reduced to one-fourth as a result of the two passages of the light beam through half-mirror 141 prior to its arrival at the image surface. On the other hand, however, the beam is almost totally free from the aberration effects of either cylindrical lens 200 or focusing lens 400 since it at all times passes in a plane including the common optical axis of these two lenses.

The embodiments of the invention described so far all use a cylindrical lens as the optical element having major and minor axes of different focal length. It should be noted, however, that this invention encompasses not only optical systems employing cylindrical lens but also optical systems employing any other type of optical element falling within said definition.

Figure 5A:
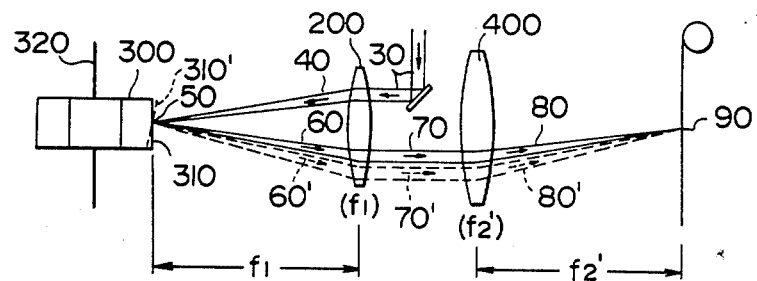
FIGS. 5A and 5B are a side view and a plan view of the embodiment shown in FIG. 4 respectively showing the manner in which displacement of the scanning line resulting from error in the parallelism of the rotating multi-face mirror is eliminated and the manner in which scanning of the light beam is accomplished.
Figure 5B:
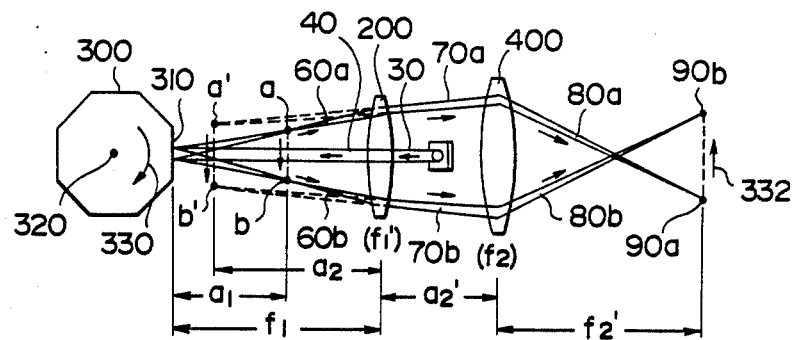

FIG. 5 shows the optical system of a fourth embodiment of this invention wherein an anamorphic lens is used as the optical element having major and minor axes of different focal length. FIG. 5A shows a side view of the optical system and FIG. 5B shows a plan view thereof. Assume that the focal lengths of the anamorphic lens serving as the optical element having major and minor axes of different focal lengths are $f1$ on the major axis and $f1'$ on the minor axis. As $f1 < f1'$ by definition, it can be stated that:

$$f1' = f1 + a1 \ (a1 > 0) \quad (1)$$

Anamorphic lens 200 is situated with its major axis perpendicular to axis of rotation 320 of rotating multi-face mirror 300 and at a distance from reflecting surface 310 of rotating multi-face mirror 300 which is equal to focal length $f1$ of anamorphic lens 200 on the major axis thereof. As shown in FIG. 5A, collimated beam 30 is focused on reflecting surface 310 of mirror 300 by anamorphic lens 200. Beam 60 reflected and deflected by rotating multi-face mirror 300 is again passed through anamorphic lens 200 to become collimated light beam 70 which then passes through anamorphic focusing lens 400 and is focused as light spot 90 on an image surface separated from lens 400 by the distance of its focal length $f2'$ along its minor axis. If the rotating multi-face mirror should have an error in its parallelism and the reflecting surface should be inclined as indicated by 310', reflected light beam 60' will be converted by anamorphic lens 200 into collimated light beam 70' and, since beam 70' is parallel to beam 70, it will focus on the image plane at the same position as light spot 90. As a consequence, displacement of the scanning line in the direction perpendicular to the direction of scanning which would otherwise result from any error in the parallelism of the rotating multi-face mirror is eliminated. Referring to the plan view shown in FIG. 5B, it will be noted that collimated beam 30 passes through anamorphic lens 200 and becomes the gradually converging beam 40. Beam 40 is reflected and deflected by rotating multi-face mirror 300 and comes to a focus at a point separated from reflecting surface 310 by the distance $a1$. The reflected beams at opposite extremities of the effective angle of deflection indicated as 60a and 60b focus at points $a$ and $b$ respectively. Upon passage of beams 60a and 60b through anamorphic lens 200, beams 60a and 60b become beams 70a and 70b issuing from the virtual image points $a'$ and $b'$ of said points $a$ and $b$. If the distance that virtual image points $a'$ and $b'$ lie forward of anamorphic lens 200 is denoted as $a2$, then:

$$\frac{1}{f1 - a1} - \frac{1}{a2} = \frac{1}{f1'} \quad (2)$$

If the focal length along the major axis of anamorphic focusing lens 400 is taken as $f2$ and the distance between anamorphic lens 200 and focusing lens 400 is taken as $a2'$ while the focal lengths $f2$ and $f2'$ along the major and minor axes of focusing lens 400 are selected to satisfy the following relation:

$$\frac{1}{a2 + a2'} + \frac{1}{f2'} = \frac{1}{f2} \quad (3)$$

then light beams 70a and 70b will be made to focus on the image surface as light spots 90a and 90b. In this embodiment the direction of scanning (arrow 332) is opposite to the direction of rotation (arrow 330) of rotating multi-face mirror 300.

Figure 6A:
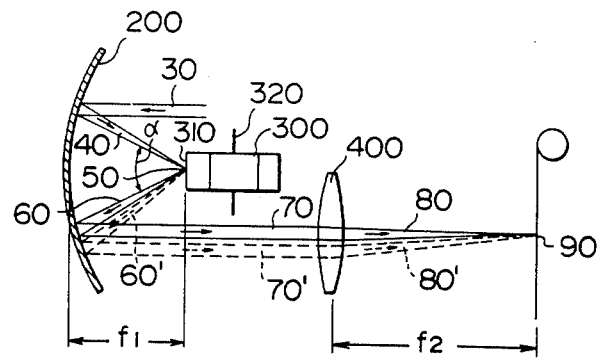
FIGS. 6A and 6B are side views respectively showing the manner in which the light beam is scanned in fifth and sixth embodiments of the present invention.
Figure 6B:
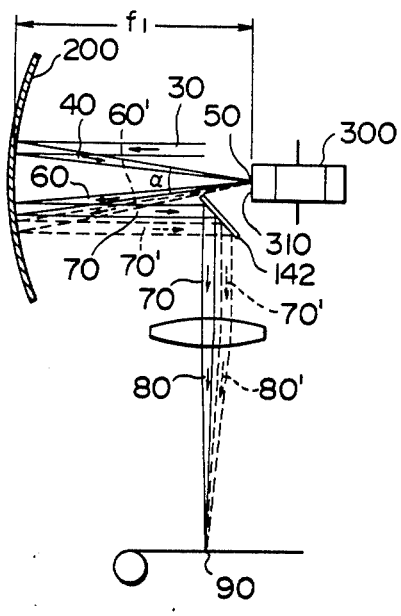

FIG. 6 shows optical systems in accordance with this invention wherein reflective type optical elements are used as the optical element having major and minor axes of different focal length. FIG. 6A shows a fifth embodiment using a parabolic mirror and FIG. 6B shows a sixth embodiment using a cylindrical mirror. Referring to FIG. 6A, if the collimated light beam 30 is directed to parabolic mirror 200 along a path lying parallel to the optical axis thereof, then beam 40 reflected by parabolic mirror 200 will produce line image 50 at the focal point of the mirror. Thus, if reflecting surface 310 of rotating multi-face mirror 300 is positioned at a distance from parabolic mirror 200 which is equal to the focal length $f1$ of parabolic mirror 200, beam 60 reflected by reflecting surface 310 will once again be reflected by parabolic mirror to become collimated light beam 70 having a path lying parallel to the optical axis of parabolic mirror 200. Beam 70 is thereafter focused by focusing lens 400 to produce light spot 90 on the image surface separated from focusing lens 400 by a distance equal to its focal length $f2$. Even is there should be an error in the parallelism of reflecting surface 310 causing beam 60 to shift to the path indicated as 60', the light spot formed by focusing lens 400 will still fall at position 90 since beam 70' reflected by the parabolic mirror will be parallel to beam 70. Consequently, no displacement of the scanning line in the direction perpendicular to the direction of scan will result from an error in the parallelism of rotating multi-face mirror 300. In this embodiment, the angle $\alpha$ between geam 40 incident on reflecting surface 310 and beam 60 reflected thereby can be made large.

In the sixth embodiment of the invention shown in FIG. 6B, cylindrical mirror 200 is provided at a distance from reflecting surface 310 equal the focal length $f1$ of cylindrical lens 200. The manner in which this arrangement prevents displacement of the scanning lines in the direction perpendicular to the direction of scan is the same as that described above in connection with the embodiment employing the parabolic lens. In this embodiment, the angle $\alpha$ between beam 40 incident on reflecting surface 310 and beam 60 reflected thereby must be kept small so that only the region of cylindrical lens 200 in the vicinity of its optical axis can be used.

The embodiments of this invention set forth hereinbefore have been described as employing a collimated light beam. Such a light beam is produceable by various known light sources and optical systems. It should be noted, however, that the light beam used in this invention need not necessarily be a collimated light beam. Instead of introducing a collimated light beam into the optical element having major and minor axes of different focal length from the very beginning, it is possible, for example, to introduce a collimated beam to the optical element after it has been passed through the focusing system for forming a light spot on the image surface. For this purpose, if a given light beam is converged at a point separated from the focusing system by a distance equal to the focal length thereof and is thereafter passed through the focusing system, it will then be possible to introduce a collimated light beam to the optical element. Further, it is possible to appropriately determine the position at which such beam should be converged by means of a reflecting mirror.

As is clear from the six embodiments described above, by the present invention it is possible to prevent any displacement of the scanning lines in the direction perpendicular to the direction of scanning even if there should be some degree of error in parallelism between the axis of rotation of the multiface mirror and its reflecting surfaces. Furthermore, since the beam scanning device in accordance with this invention requires only a single optical element having major and minor axes of different focal length, its optical system is simple and can be constructed at low cost. Differently from the device disclosed in Japanese Patent Public Disclosure No. 49315/1973 which employs two cylindrical lenses that must be positioned and oriented with respect to the reflecting surface of the rotating multi-face mirror, the present invention requires the positioning and orienting of only a single optical element having major and minor axes of different focal length and is therefore advantageous in that design and fabrication of the optical system are much simpler. Again the present invention is advantageous over that disclosed in said Japanese Patent Public Disclosure in that the invention described in the Public Disclosure requires that the light beam be introduced to the rotating multi-face mirror along a path lying within the plane in which the light beam is deflected by the rotating mirror so that the angle of incidence of the light beam on the mirror must be made large thus inviting eclipse thereof by the mirror, whereas in the present invention the problem of eclipsing does not arise there is no need to have the path of the light beam incident on the rotating multi-face mirror fall within the plane of deflection and the angle of incidence can therefore be made small. This means that in the present invention a larger effective angle of deflection can be had for an incident light beam of given diameter or, conversely, that for a given effective angle of deflection an incident beam of larger diameter may be used in the case of the present invention. Consequently, it is possible to attain better resolution of the light spot on the image surface with this invention than with the conventional devices.

I claim:

1. A beam scanning device comprising in combination:
    a light source for generating a light beam,
    a rotating multi-face mirror for reflecting and deflecting the light beam,
    an optical element having major and minor axes of different focal length located between the light source and the rotating multi-face mirror for forming on the reflecting surface of the rotating multi-face mirror a line image perpendicular to the axis of rotation of the rotating multi-face mirror and for receiving the light beam reflected and deflected by the rotating multi-face mirror and transforming it into a deflected beam of collimated light, and
    a focusing system for focusing the deflected beam of collimated light and producing a scanning light spot on the focal plane thereof,
    whereby the scanning lines produced by the scanning light spot are not displaced in the direction perpendicular to the direction of scan by error in parallelism between the optical axis and the reflecting surfaces of the rotating multi-face mirror.

2. A beam scanning device as claimed in claim 1 wherein said light source is a laser source.

3. A beam scanning device as claimed in claim 1 wherein the optical element having major and minor axes of different focal length is a cylindrical lens.

4. A beam scanning device as claimed in claim 3 wherein the deflected beam of collimated light is deflected in a plane which includes the optical axis of the focusing system.

5. A beam scanning device as claimed in claim 3 wherein the axis of rotation of the rotating multi-face mirror is tilted with respect to a line perpendicular to the common axis of the cylindrical lens and the focusing system by an angle equal to the angle of incidence of the light beam forming the line image on a reflecting surface of the rotating multi-face mirror parallel to said axis, whereby the light beam reflected and deflected by the rotating multi-face mirror is reflected and deflected in a plane including the common axis of the cylindrical lens and the focusing system.

6. A beam scanning device as claimed in claim 3 wherein a half-mirror is provided between the cylindrical lens and the focusing system for introducing the light beam generated by the light source to the cylindrical lens along a path coincident with the common optical axis of the cylindrical lens and the focusing system.

7. A beam scanning device as claimed in claim 1 wherein the optical element having major and minor axes of different focal length is an anamorphic lens.

8. A beam scanning device as claimed in claim 1 wherein the optical element having major and minor axes of different focal length is a parabolic mirror.

9. A beam scanning device as claimed in claim 1 wherein the optical element having major and minor axes of different focal length is a cylindrical mirror.

* * * * *